US008154437B2

(12) United States Patent
Tsunekawa

(10) Patent No.: US 8,154,437 B2
(45) Date of Patent: Apr. 10, 2012

(54) TRAVELING DIRECTION VECTOR RELIABILITY DETERMINATION METHOD AND TRAVELING DIRECTION VECTOR RELIABILITY DETERMINATION DEVICE

(75) Inventor: Jun Tsunekawa, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 42 days.

(21) Appl. No.: 12/669,047

(22) PCT Filed: Dec. 5, 2008

(86) PCT No.: PCT/JP2008/003635

§ 371 (c)(1), (2), (4) Date: Jan. 14, 2010

(87) PCT Pub. No.: WO2010/064283

PCT Pub. Date: Jun. 10, 2010

(65) Prior Publication Data

US 2011/0187582 A1 Aug. 4, 2011

(51) Int. Cl.
*G01S 13/58* (2006.01)

(52) U.S. Cl. .......................................................... 342/107

(58) Field of Classification Search ................... 342/107
See application file for complete search history.

(56) References Cited

U.S. PATENT DOCUMENTS

| | | | | |
|---|---|---|---|---|
| 5,600,561 A | | 2/1997 | Okamura | |
| 6,122,040 A | * | 9/2000 | Arita et al. | 356/4.01 |
| 6,301,530 B1 | * | 10/2001 | Tamura | 701/23 |
| 2005/0174282 A1 | * | 8/2005 | Nakanishi et al. | 342/109 |
| 2010/0063685 A1 | * | 3/2010 | Bullinger | 701/45 |

FOREIGN PATENT DOCUMENTS

| | | |
|---|---|---|
| JP | 5 233813 | 9/1993 |
| JP | 7 225275 | 8/1995 |
| JP | 10 239436 | 9/1998 |
| JP | 2004 110491 | 4/2004 |
| JP | 2007 279892 | 10/2007 |
| JP | 2008 137396 | 6/2008 |
| JP | 2008 197720 | 8/2008 |
| WO | WO 2006015747 A1 * | 2/2006 |

* cited by examiner

*Primary Examiner* — Thomas Tarcza
*Assistant Examiner* — Timothy A Brainard
(74) *Attorney, Agent, or Firm* — Oblon, Spivak, McClelland, Maier & Neustadt, L.L.P.

(57) ABSTRACT

There is provided a traveling direction vector reliability determination method in which reliability of a traveling direction vector of another vehicle is calculated so as to increase reliability of a collision prediction. The traveling direction vector reliability determination method determines the reliability of the traveling direction vector when the traveling direction vector is calculated based on position coordinate points of a target, which are calculated by a radar device. The method includes a traveling direction vector calculation step of calculating, based on a movement history of the position coordinate points, the traveling direction vector of the target; and a reliability calculation step of calculating, in a case where the position coordinate points include normally recognized coordinate points and estimated coordinate points, the reliability of the traveling direction vector, based on at least one of information about the normally recognized coordinate points and information about the estimated coordinate points.

15 Claims, 8 Drawing Sheets

F I G. 8

| CLASSIFICATION | AZIMUTH $\theta$ | DISTANCE R | RELATIVE VELOCITY V |
|---|---|---|---|
| NORMALLY RECOGNIZED COORDINATE POINT | ○ | ○ | ○ |
| FIRST EXTRAPOLATION COORDINATE POINT | × | × | × |
| SECOND EXTRAPOLATION COORDINATE POINT | ○ | △ | △ |

TRAVELING DIRECTION VECTOR RELIABILITY DETERMINATION METHOD AND TRAVELING DIRECTION VECTOR RELIABILITY DETERMINATION DEVICE

TECHNICAL FIELD

The present invention relates to a traveling direction vector reliability determination method and a traveling direction vector reliability determination device, and more particularly, to a traveling direction vector reliability determination method and a traveling direction vector reliability determination device in which the reliability of a traveling direction vector of another vehicle is calculated so as to increase the reliability of a collision prediction, thereby enabling reduction of unnecessary operation of a device that takes safety measures.

BACKGROUND ART

Recently, a pre-crash safety system has been developed in which position coordinate points and a relative velocity of another vehicle are obtained by a radar device and a risk of said another vehicle colliding with an own vehicle is calculated based on the movement history of the position coordinate points, such that appropriate safety measures are taken when it is determined that the risk is high.

The pre-crash safety system includes a radar device that obtains position coordinate points and a relative velocity of another vehicle, and an electronic control unit (ECU) that calculates, based on a movement history of the position coordinate points, a risk of said another vehicle colliding with an own vehicle and that causes a seat belt to be fastened and a brake to be applied when it is determined that the risk is high. In order to calculate the risk of said another vehicle colliding with the own vehicle, the ECU calculates a traveling direction vector, based on the movement history of the position coordinate points of said another vehicle.

A method for calculating the traveling direction vector is described with reference to FIG. 7.

FIG. 7 shows an example of the method for calculating the traveling direction vector.

As shown in (A) of FIG. 7, first, position coordinate points K obtained by the radar device are plotted in accordance with the order of acquisition thereof. Accordingly, a movement history of the position coordinate points is plotted. Next, as shown in (B) of FIG. 7, with regard to the movement history of the position coordinate points, linear function approximation is performed using, for example, the least square method. Thereby, a traveling direction vector 10 is generated.

As shown in (A) of FIG. 7, the position coordinate points K obtained by the radar device include normally recognized coordinate points K1, first extrapolation coordinate points K2, and second extrapolation coordinate points K3. The percentages of the normally recognized coordinate points K1, the first extrapolation coordinate points K2, and the second extrapolation coordinate points K3 and the arrangement thereof, which are shown in (A) of FIG. 7, are only an example and not limited thereto.

A normally recognized coordinate point K1 is a position coordinate point normally recognized by the radar device.

Calculation of the normally recognized coordinate point K1 requires the azimuth in which a target (hereinafter referred to as another vehicle) is located relative to the own vehicle, and the distance between said another vehicle and the own vehicle. The azimuth in which said another vehicle is located is, for example, represented by an angle θ between a straight line from the own vehicle to said another vehicle and a line representing the traveling direction of the own vehicle. Based on the measured values of the distance and the azimuth, the normally recognized coordinate point K1 can be calculated.

In a case where an FM-CW radar is used as the radar device, a distance R between the own vehicle and said another vehicle can be determined by using the following formula (1):

$$R=C(\Delta f_U+\Delta f_D)/(8 f_m \Delta F) \quad \text{formula (1),}$$

where the characters denote the following meanings:

C: the velocity of light, $\Delta f_U$: the beat frequency in the up section of a modulation wave (for example, triangular wave), $\Delta f_D$: the beat frequency in the down section of the modulation wave, $f_m$: the repetition frequency of the modulation wave, and ΔF: the amplitude of the modulation wave.

The angle θ can be measured by using, for example, a monopulse system. In this case, the angle θ can be calculated by using the following formula (2):

$$\theta=\sin^{-1}(\lambda\phi/(2\pi d)) \quad \text{formula (2),}$$

where the characters denote the following meanings:

λ: the wavelength of a transmission wave, d: the distance between two antennas, and ϕ: the phase difference of a reflected wave received by the two antennas.

In a case where an FM-CW radar is used as the radar device, a relative velocity V of said another vehicle can be determined by using the following formula (3):

$$V=\pm(\Delta f_U-\Delta f_D)/2 \quad \text{formula (3),}$$

where the characters denote the following meanings:

$\Delta f_U$: the beat frequency in the up section of the modulation wave (for example, triangular wave), and $\Delta f_D$: the beat frequency in the down section of the modulation wave.

A first extrapolation coordinate point K2 is a position coordinate point estimated through first extrapolation processing. In the first extrapolation processing, in a case where the radar device performing periodical target detections has succeeded in detecting a position coordinate point and a relative velocity of said another vehicle in a previous detection cycle but has failed in detecting any of measurement parameters for specifying a position coordinate point and a relative velocity of said another vehicle in a current detection cycle, the radar device estimates the position coordinate point and the relative velocity of the current detection cycle, based on values of the measurement parameters for said another vehicle which are obtained in the previous detection cycle.

The first extrapolation processing is performed in a case where, in the current detection cycle, the radar device has measured, as the measurement parameters, neither the beat frequency $\Delta f_U$ of the up section nor the beat frequency $\Delta f_D$ of the down section. The beat frequency $\Delta f_U$ of the up section and the beat frequency $\Delta f_D$ of the down section which are obtained in the previous detection cycle may be actually measured values or estimated values. In a case where the beat frequency $\Delta f_U$ of the up section and the beat frequency $\Delta f_D$ of the down section which are obtained in the previous detection cycle are estimated values, first extrapolation coordinate points K2 may be obtained in succession, or a first extrapolation coordinate point K2 and a second extrapolation coordinate point K3 may be obtained in succession.

A second extrapolation coordinate point is a position coordinate point estimated through second extrapolation processing. In the second extrapolation processing, in a case where the radar device performing periodical target detections has succeeded in detecting a position coordinate point and a relative velocity of said another vehicle in a previous detection cycle but has failed in detecting some of the measurement parameters for specifying a position coordinate point and a relative velocity of said another vehicle in a current detection cycle, the radar device estimates the position coordinate point and a relative velocity of the current detection cycle, based on the values of the measurement parameters for said another vehicle which are obtained in the previous detection cycle.

The second extrapolation processing is performed in a case where, in the current detection cycle, the radar device has failed in measuring, as the measurement parameters, either one of the beat frequency $\Delta f_U$ of the up section and the beat frequency $\Delta f_D$ of the down section. Estimation of a position coordinate point and a relative velocity through the second extrapolation processing requires, in order to make up the beat frequency that has not been measured, a beat frequency obtained in a previous detection cycle. The beat frequency obtained in the previous detection cycle may be an actually measured beat frequency or an estimated beat frequency. When the beat frequency obtained in the previous detection cycle is an estimated beat frequency, second extrapolation coordinate points K3 may be obtained in succession, or a first extrapolation coordinate point K2 and a second extrapolation coordinate point K3 may be obtained in succession.

FIG. 8 is a diagram illustrating a relationship between: the normally recognized coordinate point, the first extrapolation coordinate point and the second extrapolation coordinate point; and the azimuth in which another vehicle is located, the relative velocity of said another vehicle and the distance between said another vehicle and the own vehicle. A circle denotes that the corresponding measurement parameters have been normally measured by the radar device. A triangle denotes that some of the parameters necessary for the radar device to measure the relative velocity and the distance have not been measured. A cross denotes that none of the parameters necessary for the radar device to measure the relative velocity and the distance have been measured.

As shown in FIG. 8, a first extrapolation coordinate point K2 is calculated in a case where the azimuth θ has not been measured and none of the parameters (the beat frequency $\Delta f_U$ of the up section and the beat frequency $\Delta f_D$ of the down section) necessary to measure the distance R and the relative velocity V have been measured. A second extrapolation coordinate point K3 is calculated in a case where the azimuth θ has been measured but some of the parameters necessary to measure the distance R and the relative velocity V (either one of the beat frequency $\Delta f_U$ of the up section and the beat frequency $\Delta f_D$ of the down section) have not been measured.

As described above, the position coordinate points K obtained by the radar device include normally recognized coordinate points K1, first extrapolation coordinate points K2, and second extrapolation coordinate points K3. Since the normally recognized coordinate points K1 are highly reliable, in a case where a group of the position coordinate points consists only of the normally recognized coordinate points K1, the reliability of the traveling direction vector 10 is also high. On the other hand, the first extrapolation coordinate points K2 and the second extrapolation coordinate points K3, which are estimated coordinate points, are less reliable. Therefore, the reliability of the traveling direction vector 10 is lowered in accordance with an increase of the percentages of the first extrapolation coordinate points K2 and the second extrapolation coordinate points K3 in the group of the position coordinate points. A collision prediction made based on a less reliable traveling direction vector 10 may more likely to lead to a wrong prediction. On the other hand, generation of a traveling direction vector 10 without using extrapolation coordinate points may result in a delayed generation of the traveling direction vector 10 and thus a delayed collision prediction, whereby measures against a collision may not be taken in advance.

Patent Document 1 discloses a system in which position coordinate points of another vehicle are obtained by a radar device and a traveling direction vector is calculated based on the movement history of the position coordinate points, so as to make a collision prediction about the collision between said another vehicle and the own vehicle. However, since the reliability of the traveling direction vector is not calculated, a prediction that there will be a collision may be made even when the possibility of the collision is actually low, which may result in actuation of a device that takes safety measures.

Patent Document 1: Japanese Laid-open Patent Publication No. 2007-279892

DISCLOSURE OF THE INVENTION

Problems to be Solved by the Invention

The present invention is made to solve the problems described above. An object of the present invention is to provide a traveling direction vector reliability determination method in which reliability of a traveling direction vector of another vehicle is calculated so as to increase reliability of a collision prediction, thereby enabling reduction of unnecessary operation of a device that takes safety measures.

Solution to the Problems

A first aspect of the present invention is directed to a traveling direction vector reliability determination method for determining reliability of a traveling direction vector when the traveling direction vector is calculated based on position coordinate points of a target, the position coordinate points being calculated by a radar device, the method including:

a traveling direction vector calculation step of calculating, based on a movement history of the position coordinate points, the traveling direction vector of the target; and a reliability calculation step of calculating, in a case where the position coordinate points include at least one normally recognized coordinate point normally recognized by the radar device and at least one estimated coordinate point estimated by the radar device, the reliability of the traveling direction vector, based on at least one of information about the at least one normally recognized coordinate point and information about the at least one estimated coordinate point.

According to the first aspect, in a case where the position coordinate points include at least one normally recognized coordinate point normally recognized by the radar device and at least one estimated coordinate point estimated by the radar device, the reliability of the traveling direction vector is calculated in the reliability calculation step, whereby the reliability of the collision prediction can be increased, allowing reduction of unnecessary operations of a device that takes safety measures.

In a second aspect based on the first aspect, in the reliability calculation step, the reliability of the traveling direction vector is calculated based on a percentage of the at least one normally recognized coordinate point in the position coordinate points.

According to the second aspect, in the reliability calculation step, the reliability of the traveling direction vector is calculated based on the percentage of the at least one normally recognized coordinate point in the position coordinate points, whereby the reliability of the traveling direction vector can be accurately calculated.

In a third aspect based on the first aspect, in the reliability calculation step, the reliability of the traveling direction vector is calculated based on a percentage of the at least one estimated coordinate point in the position coordinate points.

According to the third aspect, in the reliability calculation step, the reliability of the traveling direction vector is calculated based on the percentage of the at least one estimated coordinate point in the position coordinate points, whereby the reliability of the traveling direction vector can be accurately calculated.

In a fourth aspect based on the first aspect, in the reliability calculation step, the reliability of the traveling direction vector is calculated based on the number of the at least one estimated coordinate point obtained in succession.

According to the fourth aspect, the reliability of the traveling direction vector is calculated based on the number of the at least one estimated coordinate point obtained in succession, whereby the reliability of the traveling direction vector can be accurately calculated.

In a fifth aspect based on the first aspect, the at least one estimated coordinate point includes at least one first extrapolation coordinate point estimated through first extrapolation processing; and in the first extrapolation processing, in a case where the radar device has succeeded in detecting one of the position coordinate points and a relative velocity of the target in a previous detection cycle but has failed in detecting any of measurement parameters for specifying a position coordinate point and a relative velocity of the target in a current detection cycle, the radar device estimates the position coordinate point and the relative velocity of the current detection cycle, based on values of the measurement parameters for the target which are obtained in the previous detection cycle.

According to the fifth aspect, even when none of the measurement parameters for specifying the position coordinate point and the relative velocity of the target have been detected in the current detection cycle, the position coordinate point and the relative velocity of the current detection cycle can be estimated.

In a sixth aspect based on the fifth aspect, in the reliability calculation step, the reliability of the traveling direction vector is calculated based on a percentage of the at least one first extrapolation coordinate point in the position coordinate points.

According to the sixth aspect, in the reliability calculation step, the reliability of the traveling direction vector is calculated based on the percentage of the at least one first extrapolation coordinate point in the position coordinate points, whereby the reliability of the traveling direction vector can be accurately calculated.

In a seventh aspect based on the fifth aspect, in the reliability calculation step, the reliability of the traveling direction vector is calculated based on the number of the at least one first extrapolation coordinate point obtained in succession.

According to the seventh aspect, in the reliability calculation step, the reliability of the traveling direction vector is calculated based on the number of the at least one first extrapolation coordinate point obtained in succession, whereby the reliability of the traveling direction vector can be accurately calculated.

In a eighth aspect based on the first aspect, the at least one estimated coordinate point includes at least one second extrapolation coordinate point estimated through second extrapolation processing; and in the second extrapolation processing, in a case where the radar device has succeeded in detecting one of the position coordinate points and a relative velocity of the target in a previous detection cycle but has failed in detecting some of measurement parameters for specifying a position coordinate point and a relative velocity of the target in a current detection cycle, the radar device estimates the position coordinate point and the relative velocity of the current detection cycle, based on values of the measurement parameters for the target which are obtained in the previous detection cycle.

According to the eighth aspect, even when some of the measurement parameters for specifying the position coordinate point and the relative velocity of the target have not been detected in the current detection cycle, the position coordinate point and the relative velocity of the current detection cycle can be estimated.

In a ninth aspect based on the eighth aspect, in the reliability calculation step, the reliability of the traveling direction vector is calculated based on a percentage of the at least one second extrapolation coordinate point in the position coordinate points.

According to the ninth aspect, in the reliability calculation step, the reliability of the traveling direction vector is calculated based on the percentage of the at least one second extrapolation coordinate point in the position coordinate points, whereby the reliability of the traveling direction vector can be accurately calculated.

In a tenth aspect based on the eighth or the ninth aspect, in the reliability calculation step, the reliability of the traveling direction vector is calculated based on the number of the at least one second extrapolation coordinate point obtained in succession.

According to the tenth aspect, in the reliability calculation step, the reliability of the traveling direction vector is calculated based on the number of the at least one second extrapolation coordinate point obtained in succession, whereby the reliability of the traveling direction vector can be accurately calculated.

In an eleventh aspect based on the first aspect, the at least one estimated coordinate point includes at least one of at least one first extrapolation coordinate point estimated through first extrapolation processing and at least one second extrapolation coordinate point estimated through second extrapolation processing;

in the first extrapolation processing, in a case where the radar device has succeeded in detecting one of the position coordinate points and a relative velocity of the target in a previous detection cycle but has failed in detecting any of measurement parameters for specifying a position coordinate point and a relative velocity of the target in a current detection cycle, the radar device estimates the position coordinate point and the relative velocity of the current detection cycle, based on values of the measurement parameters for the target which are obtained in the previous detection cycle; and in the second extrapolation processing, in a case where the radar device has succeeded in detecting one of the position coordinate points and a relative velocity of the target in a previous detection cycle but has failed in detecting some of the measurement parameters for specifying a position coordinate point and a relative velocity of the target in a current detection cycle, the radar device estimates the position coordinate point and the relative velocity of the current detection cycle, based on values of the measurement parameters for the target which are obtained in the previous detection cycle.

According to the eleventh aspect, even when none of the measurement parameters for specifying the position coordinate point and the relative velocity of the target have been detected in the current detection cycle, or even when some of the measurement parameters for specifying the position coordinate point and the relative velocity of the target have not been detected in the current detection cycle, the position coordinate point and the relative velocity of the current detection cycle can be estimated.

In a twelfth aspect based on the fifth aspect, in a case where the radar device is an FM-CW radar, the measurement parameters for specifying the position coordinate point and the relative velocity of the target are a beat frequency of an up section of, and a beat frequency of a down section of, a modulation wave.

According to the twelfth aspect, the position coordinate point and the relative velocity of the current detection cycle can be estimated, based on the beat frequency of the up section and the beat frequency of the down section of the modulation wave which are obtained in the previous detection cycle.

In a thirteenth aspect based on the first aspects, in the traveling direction vector calculation step, the traveling direction vector of the target is calculated based on the movement history of the at least one normally recognized coordinate point.

According to the thirteenth aspect, even when the position coordinate points of the target calculated by the radar device include both of the at least one normally recognized coordinate point and the at least one estimated coordinate point, the traveling direction vector can be calculated based on the at least one normally recognized coordinate point that is reliable.

In the fourteenth aspect, a traveling direction vector reliability determination device for determining reliability of a traveling direction vector when the traveling direction vector is calculated based on position coordinate points of a target, the position coordinate points being calculated by a radar device, includes a traveling direction vector calculation section that calculates, based on a movement history of the position coordinate points, the traveling direction vector of the target; and a reliability calculation section that calculates, in a case where the position coordinate points include at least one normally recognized coordinate point normally recognized by the radar device and at least one estimated coordinate point estimated by the radar device, the reliability of the traveling direction vector, based on at least one of information about the at least one normally recognized coordinate point and information about the at least one estimated coordinate point.

According to the fourteenth aspect, in a case where the position coordinate points include at least one normally recognized coordinate point normally recognized by the radar device and at least one estimated coordinate point estimated by the radar device, the reliability of the traveling direction vector is calculated by the reliability calculation section, whereby the reliability of the collision prediction is increased, allowing reduction of an unnecessary operations of a device that takes safety measures.

Effect of the Invention

According to the present invention, the reliability of the traveling direction vector can be calculated, whereby the reliability of the collision prediction is increased, allowing reduction of unnecessary operation of a device that takes safety measures.

BRIEF DESCRIPTION OF THE DRAWINGS

FIG. 8 shows a relationship between: a normally recognized coordinate point, a first extrapolation coordinate point and a second extrapolation coordinate point; and the azimuth in which another vehicle is located, the relative velocity of said another vehicle and the distance between an own vehicle and said another vehicle.

DESCRIPTION OF THE REFERENCE CHARACTERS

Figure 1:
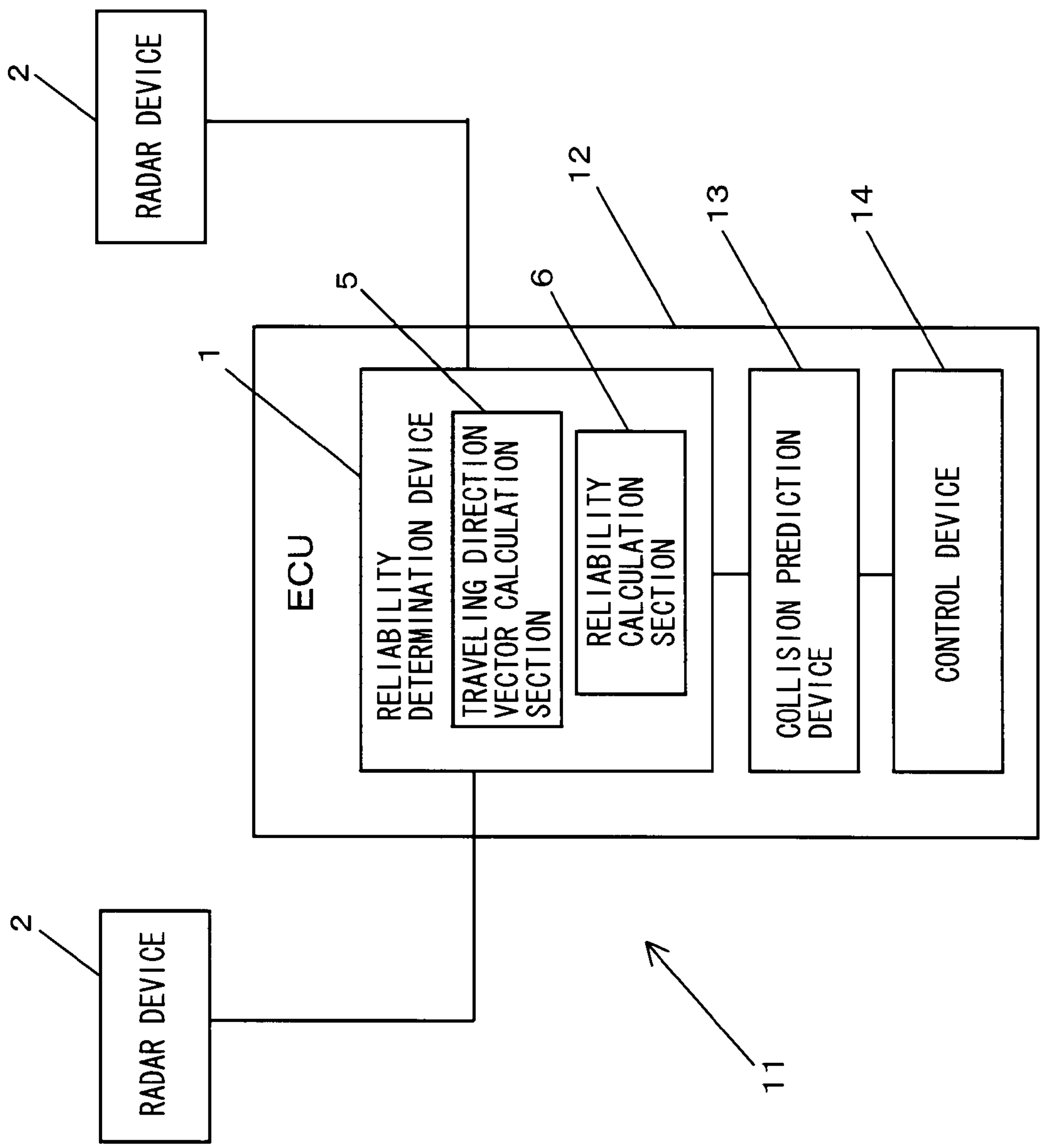
FIG. 1 is a block diagram illustrating an example of a traveling direction vector reliability determination device for realizing a first embodiment of a traveling direction vector reliability determination method.

1 traveling direction vector reliability determination device
2 radar device
3 another vehicle (target)
4 traveling direction vector
5 traveling direction vector calculation section
6 reliability calculation section
7 first group
8 second group
9 own vehicle
11 pre-crash safety system
12 electronic control unit (ECU)
13 collision prediction device
14 control device
P position coordinate point
P1 normally recognized coordinate point
P2 estimated coordinate point
P21 first extrapolation coordinate point
P22 second extrapolation coordinate point
R distance
V relative velocity
θ azimuth in which another vehicle is located

BEST MODE FOR CARRYING OUT THE INVENTION

First Embodiment

A first embodiment of the present invention is described with reference to the drawings.

Figure 2:
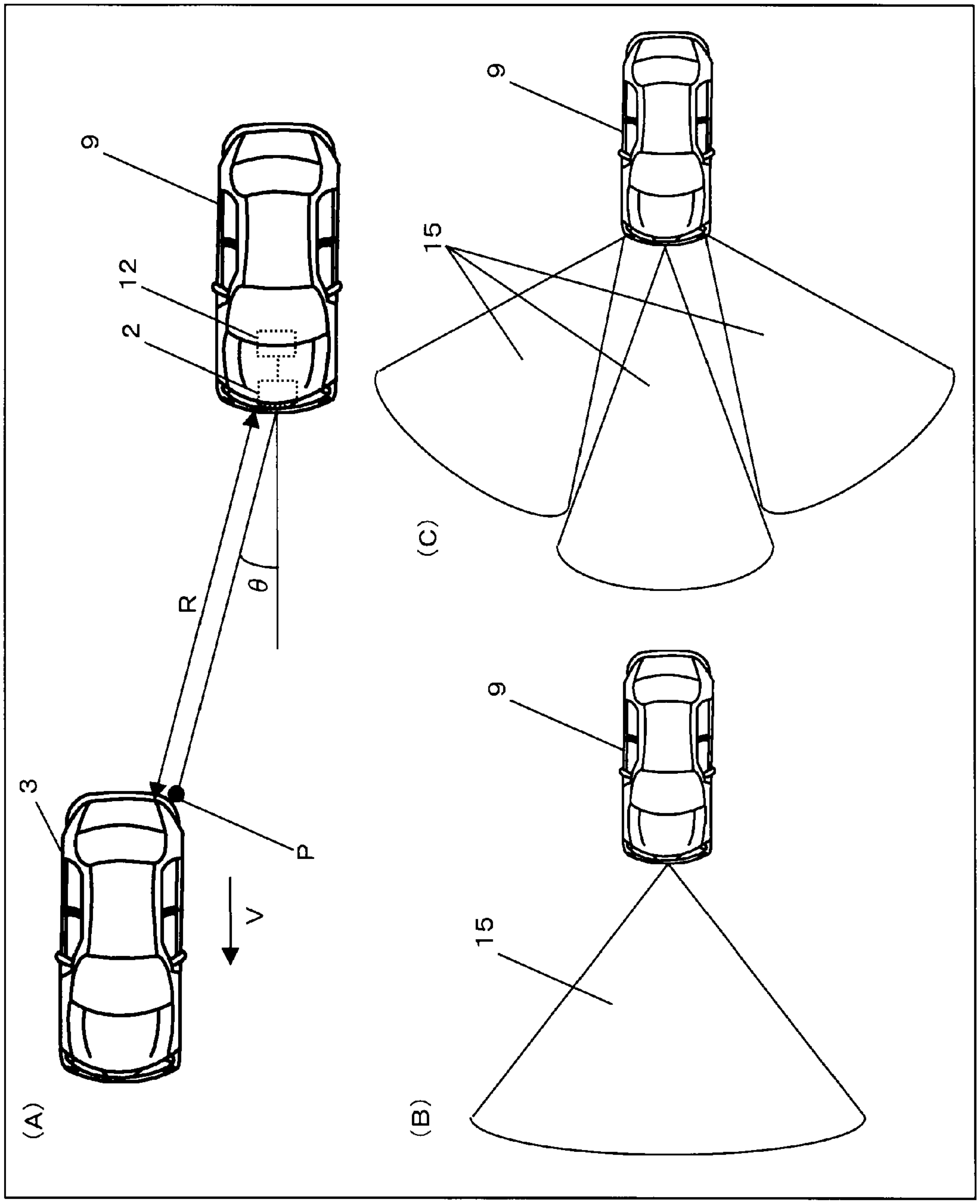
FIG. 2 shows a positional relationship between an own vehicle and another vehicle in the first embodiment.
Figure 3:
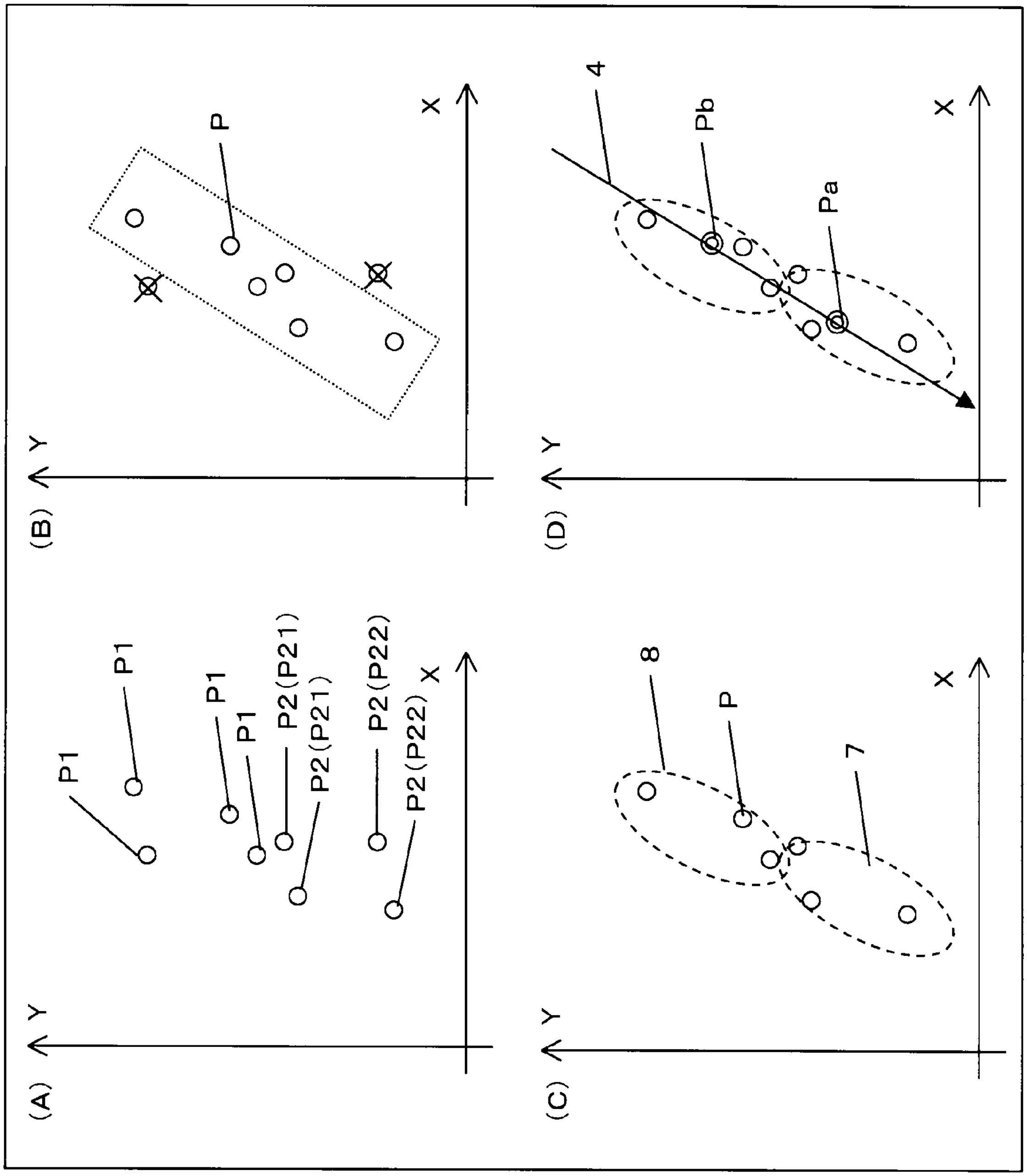
FIG. 3 shows an example of a method for calculating a traveling direction vector in the first embodiment.

FIG. 1 is a block diagram illustrating an example of a traveling direction vector reliability determination device for realizing a traveling direction vector reliability determination method according to the first embodiment. In the examples shown in FIG. 1, the reliability determination device is a part of a pre-crash safety system. FIG. 2 shows a positional relationship between an own vehicle and another vehicle. FIG. 3 shows an example of a method for calculating a traveling direction vector.

A pre-crash safety system 11 shown in FIG. 1 is mounted in an own vehicle 9. The pre-crash safety system 11 is a system in which position coordinate points P and a relative velocity V of another vehicle 3 (see FIG. 2) are obtained by a radar device 2, a risk of said another vehicle 3 colliding with the own vehicle 9 is calculated based on the movement history (see FIG. 3) of the position coordinate points P, and suitable safety measures are taken when it is determined that the risk is high. The pre-crash safety system 11 includes the radar device 2 that obtains position coordinate points P and a relative velocity V of said another vehicle 3, and an electronic control unit (ECU) 12 that calculates, based on the movement history of the position coordinate points P, a risk of said another vehicle 3 colliding with the own vehicle 9 and causes a seat belt to be fastened and a brake to be applied when it is determined that the risk is high. In order to calculate the risk of said another vehicle 3 colliding with the own vehicle 9, the ECU 12 calculates a traveling direction vector 4 (see FIG. 3), based on the movement history of the position coordinate points P of said another vehicle 3. The method for calculating the traveling direction vector 4 is described below.

The ECU 12 includes a reliability determination device 1 according to the first embodiment, a collision prediction device 13, and a control device 14.

The reliability determination device 1 determines the reliability of the traveling direction vector 4 when the traveling direction vector 4 is calculated based on the position coordinate points P of a target (hereinafter referred to as another vehicle) 3 which are calculated by the radar device 2.

The collision prediction device 13 makes a collision prediction based on the traveling direction vector 4, when the reliability calculated by the reliability determination device 1 is not less than a predetermined threshold.

The control device 14 performs control for taking the aforementioned suitable safety measures when the collision prediction device 13 determines that said another vehicle 3 is going to collide with the own vehicle 9.

The radar device 2 obtains position coordinate points P and a relative velocity V of said another vehicle 3 (see (A) of FIG. 2). The relative velocity V is a relative velocity of said another vehicle 3 relative to the own vehicle 9. Surrounding monitoring may be performed by one radar device 2 (see (B) of FIG. 2), by two radar devices 2 (see FIG. 1), or by three or more radar devices 2 (see (C) of FIG. 2). The numerals "15" in (B) and (C) of FIG. 2 show areas monitored by the radar devices 2, respectively.

As shown in FIG. 3, position coordinate points P obtained by the radar device 2 include normally recognized coordinate points P1 and estimated coordinate points P2. The estimated coordinate points P2 include first extrapolation coordinate points P21 and second extrapolation coordinate points 22. The percentages of the normally recognized coordinate points P1, the first extrapolation coordinate points P21, and the second extrapolation coordinate points P22, and the arrangement thereof, shown in FIG. 3, are only an example and not limited thereto.

A normally recognized coordinate point P1 is a position coordinate point normally recognized by the radar device 2.

Calculation of the normally recognized coordinate point P1 requires an azimuth θ in which said another vehicle 3 is located relative to the own vehicle 9, and a distance R between said another vehicle 3 and the own vehicle 9 (see (A) of FIG. 2). The azimuth θ in which said another vehicle 3 is located is, for example, represented by an angle θ between a straight line from the own vehicle 9 to said another vehicle 3 and a line representing the traveling direction of the own vehicle 9. Based on these measured values, the normally recognized coordinate point P1 can be calculated.

Although the type of the radar device 2 is not limited in particular, an FM-CW radar may be used, for example.

In a case where an FM-CW radar is used as the radar device 2, the distance R between said another vehicle 3 and the own vehicle 9 can be determined by using the following formula (1):

$$R=C(\Delta f_U+\Delta f_D)/(8 f_m \Delta F) \quad \text{formula (1)},$$

where the characters denote the following meanings: C: the velocity of light, $\Delta f_U$: the beat frequency in the up section of a modulation wave (for example, triangular wave), $\Delta f_D$: the beat frequency in the down section of the modulation wave, $f_m$: the repetition frequency of the modulation wave, and ΔF: the amplitude of the modulation wave.

In a case where an FM-CW radar is used as the radar device 2, the relative velocity V of said another vehicle 3 can be determined by using the following formula (2):

$$V=\pm(\Delta f_U-\Delta f_D)/2 \quad \text{formula (2)},$$

where the characters denote the following meanings: $\Delta f_U$: the beat frequency in the up section of the modulation wave (for example, triangular wave), and $\Delta f_D$: the beat frequency in the down section of the modulation wave.

The angle θ can be measured by using, for example, a monopulse system. In this case, the angle θ can be calculated by using the following formula (3):

$$\theta=\sin^{-1}(\lambda\phi/(2\pi d)) \quad \text{formula (3)},$$

where the characters denote the following meanings: λ: the wavelength of a transmission wave, d: the distance between two antennas, and ϕ: the phase difference of a reflected wave received by the two antennas.

A first extrapolation coordinate point P21 is a position coordinate point estimated through first extrapolation processing.

In the first extrapolation processing, in a case where the radar device 2 performing periodical target detections has succeeded in detecting a position coordinate point P and a relative velocity V of said another vehicle 3 in a previous detection cycle but has failed in detecting any of the measurement parameters for specifying a position coordinate point P and a relative velocity V of said another vehicle in a current detection cycle, the radar device 2 estimates the position coordinate point P and the relative velocity V of the current detection cycle, based on values of the measurement parameters for said another vehicle 3 which are obtained in the previous detection cycle. The values of the measurement parameters for said another vehicle 3 obtained in the previous detection cycle are, for example, values of the measurement parameters obtained in an immediately preceding detection cycle. The values of the measurement parameters obtained in the immediately preceding detection cycle may be actually measured values or estimated values. In a case where the radar device 2 is an FM-CW radar, the measurement parameters for specifying a position coordinate point P and a relative velocity V of said another vehicle 3 are the beat frequency $\Delta f_U$ of the up section and the beat frequency $\Delta f_D$, of the down section of the modulation wave (for example, triangular wave).

Suppose the position coordinate point of the current detection cycle is $P_n$ and the position coordinate point of the immediately preceding detection cycle is $P_{n-1}$, the position coordinate point $P_n$ in the current detection cycle can be calculated in accordance with, for example, the following formulas (4) and (5). Note that, in the following formulas, $X_n$ is the X direction component of $P_n$, $X_{n-1}$ is the X direction component of $P_{n-1}$, $Y_n$ is the Y direction component of $P_n$, and $Y_{n-1}$ is the Y direction component of $P_{n-1}$. $Vx_{n-1}$ is the X direction component of the relative velocity in the immediately preceding detection cycle, and $Vy_{n-1}$ is the Y direction component of the relative velocity in the immediately preceding detection cycle. $\Delta t$ is the time of a detection cycle.

$$X_n = X_{n-1} + Vx_{n-1} \times \Delta t \quad \text{formula (4)}$$

$$Y_n = Y_{n-1} + Vy_{n-1} \times \Delta t \quad \text{formula (5)}$$

Further, suppose $Vx_n$ is the X direction component of the relative velocity $V_n$, of the current detection cycle, and $Vy_n$ is the Y direction component; and $Vx_{n-1}$ is the X direction component of the relative velocity $V_{n-1}$ of the immediately preceding detection cycle, and $Vy_{n-1}$ is the Y direction component, the relative velocity $V_n$ of the current detection cycle can be calculated in accordance with, for example, the following formulas (6) and (7):

$$Vx_n = Vx_{n-1} \quad \text{formula (6)}$$

$$Vy_n = Vy_{n-1} \quad \text{formula (7)}$$

A second extrapolation coordinate point P22 is a position coordinate point estimated through second extrapolation processing.

In the second extrapolation processing, in a case where the radar device 2 performing periodical target detections has succeeded in detecting a position coordinate point P and a relative velocity V of said another vehicle 3 in a previous detection cycle but has failed in detecting some of the measurement parameters for specifying a position coordinate point P and a relative velocity V of said another vehicle 3 in a current detection cycle, the radar device 2 estimates the position coordinate point P and the relative velocity V of the current detection cycle, based on values of the measurement parameters for said another vehicle 3 which are obtained in the previous detection cycle. The values of the measurement parameters for said another vehicle 3 obtained in the previous detection cycle are, for example, values of the measurement parameters obtained in an immediately preceding detection cycle. The values of the measurement parameters obtained in the immediately preceding detection cycle may be actually measured values or estimated values. In a case where the radar device 2 is an FM-CW radar, the measurement parameters for specifying the position coordinate point P and the relative velocity V of said another vehicle 3 are the beat frequency $\Delta f_U$ of the up section and the beat frequency $\Delta f_D$ of the down section of the modulation wave (for example, triangular wave).

Suppose the position coordinate point of the current detection cycle is $P_n$ and the position coordinate point of the immediately preceding detection cycle is $P_{n-1}$, the position coordinate point $P_n$ in the current detection cycle can be calculated, for example, in the following manner.

In a case where either one of the beat frequency $\Delta f_U$ of the up section and the beat frequency $\Delta f_D$ of the down section has not been measured in the current detection cycle, with regard to the parameter that has not been measured, the value of the measurement parameter obtained in the immediately preceding detection cycle is substituted into the aforementioned formulas (1) and (2), and with regard to the parameter that has been measured, the measured value is substituted, so as to calculate a distance R and a relative velocity V. Note that, it is assumed that an azimuth θ has been detected in the current detection cycle. Once the distance R and the azimuth θ have been calculated, the second extrapolation coordinate point P22 in the current detection cycle can be calculated based on those values.

The reliability determination device 1 includes a traveling direction vector calculation section 5 and a reliability calculation section 6.

The traveling direction vector calculation section 5 calculates the traveling direction vector 4 of said another vehicle 3, based on the movement history of the position coordinate points P. Although the method for calculating the traveling direction vector 4 is not limited in particular, the following method can be used for calculation of the traveling direction vector 4.

As shown in FIG. 3 (A), the position coordinate points P obtained by the radar device 2 are plotted in accordance with the order of acquisition thereof. Next, as shown in (B) of FIG. 3, position coordinate points P that deviate to a great extent are excluded from the data to be used for calculating the traveling direction vector 4. Next, as shown in (C) of FIG. 3, the remaining position coordinate points P are divided into two groups, that is, a first group 7 containing the position coordinate points obtained earlier and a second group 8 containing the position coordinate points obtained later. Next, as shown in (D) of FIG. 3, a centroid position Pa of the first group 7 and a centroid position Pb of the second group 8 are calculated, and a vector passing through the centroid position Pa and the centroid position Pb is set as the traveling direction vector 4. The direction of the traveling direction vector 4 is set from the centroid position Pa toward the centroid position Pb. Note that, the number of the position coordinate points P is the number of the position coordinate points P that are obtained in a predetermined number of the detection cycles before the current detection cycle. The predetermined number of the detection cycles is not limited in particular.

In a case where the position coordinate points P include normally recognized coordinate points P1 that are normally recognized by the radar device 2 and estimated coordinate points P2 that are estimated by the radar device 2, the reliability calculation section 6 calculates reliability of the traveling direction vector 4, based on at least one of information about the normally recognized coordinate points P1 and information about the estimated coordinate points P2.

The reliability calculation section 6 is capable of calculating the reliability of the traveling direction vector 4, based on the percentage of the normally recognized coordinate points P1 in the position coordinate points P (calculation example 1). In this case, the percentage of the normally recognized coordinate points P1 in the position coordinate points P is the information about the normally recognized coordinate points P1. Note that, the number of the position coordinate points P is the number of the position coordinate points P that are obtained in a predetermined number of the detection cycles before the current detection cycle. The predetermined number of the detection cycles is not limited in particular.

Further, the reliability calculation section 6 is capable of calculating the reliability of the traveling direction vector 4, based on the percentage of the estimated coordinate points P2 in the position coordinate points P (calculation example 2). In this case, the percentage of the estimated coordinate points P2 in the position coordinate points P is the information about the estimated coordinate points P2. The estimated coordinate points P2 include first extrapolation coordinate points P21 and second extrapolation coordinate points P22.

Further, the reliability calculation section 6 is capable of calculating the reliability of the traveling direction vector 4, based on the number of the estimated coordinate points P2 that are obtained in succession (calculation example 3).

Further, the reliability calculation section 6 is capable of calculating the reliability of the traveling direction vector 4, based on the percentage of the first extrapolation coordinate points P21 in the position coordinate points P (calculation example 4).

Further, the reliability calculation section 6 is capable of calculating the reliability of the traveling direction vector 4, based on the number of the first extrapolation coordinate points P21 that are obtained in succession (calculation example 5).

Further, the reliability calculation section 6 is capable of calculating the reliability of the traveling direction vector 4, based on the percentage of the second extrapolation coordinate points P22 in the position coordinate points P (calculation example 6).

Further, the reliability calculation section 6 is capable of calculating the reliability of the traveling direction vector 4, based on the number of the second extrapolation coordinate points P22 that are obtained in succession (calculation example 7).

In the present embodiment, one of the aforementioned calculation examples 1 to 7 may be employed. However, any combination of two or more of the calculation examples may be employed.

Next, an exemplary reliability determination of a traveling direction vector 4 is described with reference to the flow chart shown in FIG. 4.

Figure 4:
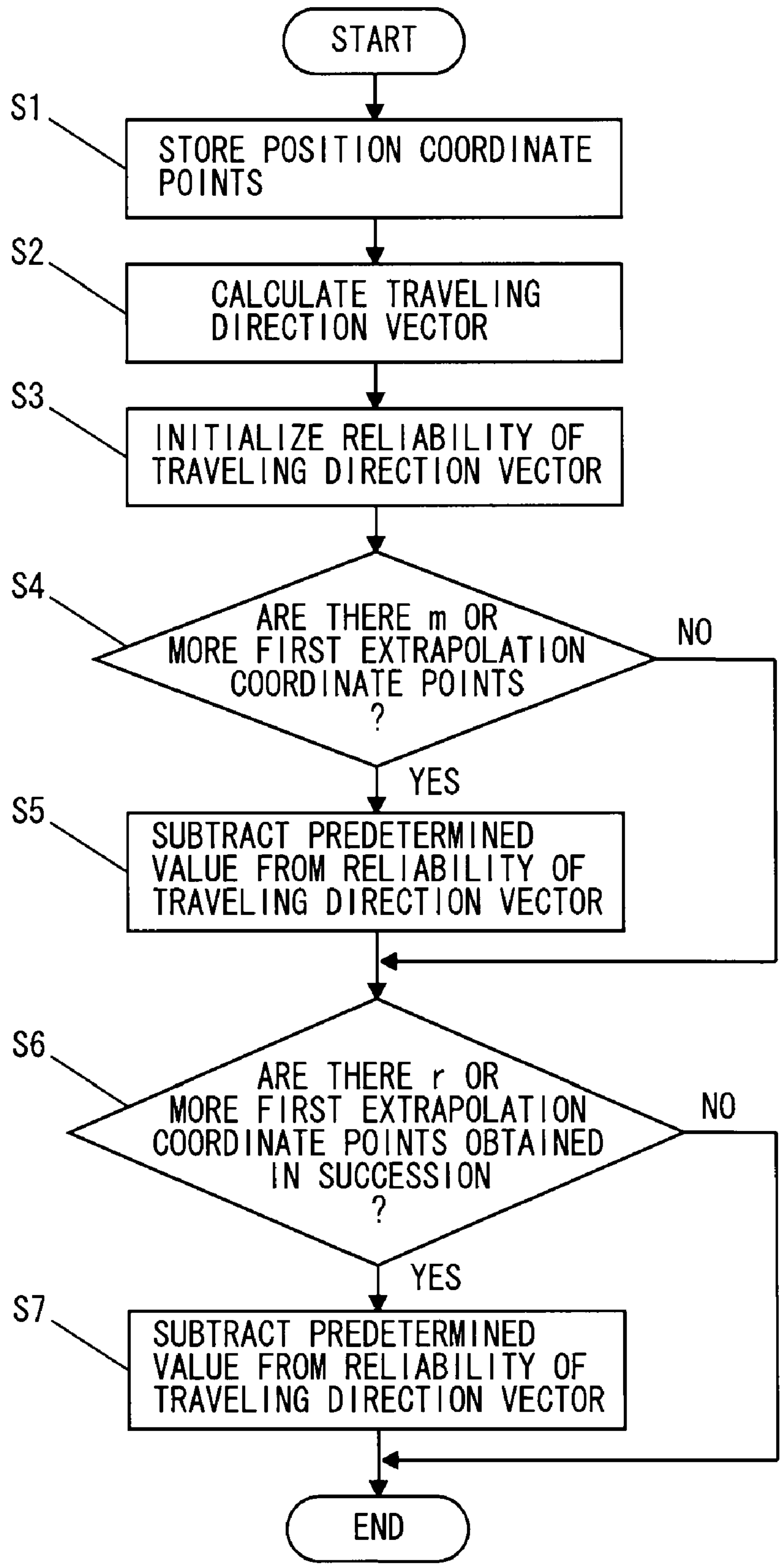
FIG. 4 shows an example of traveling direction vector reliability determination in the first embodiment.

As shown in FIG. 4, first, the reliability calculation section 6 stores, in a memory, N position coordinate points P that are obtained by the radar device 2 in N cycles of detection in the past (Step S1).

Next, the reliability calculation section 6 calculates a traveling direction vector 4, based on the N position coordinate points P that are stored (Step S2).

Next, the reliability of the traveling direction vector 4 is initialized (Step S3). In Step 3, the reliability is set to, for example, 100%.

Next, the reliability calculation section 6 determines whether or not m (m is an arbitrary integer not less than 1 and not more than N) or more first extrapolation coordinate points P21 are included in the N position coordinate points P (Step S4).

When m or more first extrapolation coordinate points P21 are included (YES in Step S4), a predetermined value is subtracted from the reliability of the traveling direction vector 4 (Step S5). Although the predetermined value to be subtracted in Step S4 is not limited in particular, 20%, for example, is subtracted.

On the other hand, when only less than m first extrapolation coordinate points P21 are included (NO in Step S4), the processing proceeds to Step S6.

In Step S6, the reliability calculation section 6 determines whether or not r (r is an arbitrary integer not less than 1 and not more than N) or more first extrapolation coordinate points P21 that are obtained in succession are included in the N position coordinate points P.

When r or more first extrapolation coordinate points P21 that are obtained in succession are included (YES in Step S6), a predetermined value is subtracted from the reliability of the traveling direction vector 4 (Step S7), and the processing is ended. Although the predetermined value to be subtracted in Step S7 is not limited in particular, 10%, for example, is subtracted.

On the other hand, when only less than r first extrapolation coordinate points P21 that are obtained in succession are included (NO in Step S6), the processing is ended.

This is the end of the exemplary reliability determination of traveling direction vector 4.

As described above, when the value to be subtracted in Step S3 is set to 20% and the value to be subtracted in Step S7 is set to 10%, the reliability is determined in the following manner. That is, when m or more first extrapolation coordinate points P21 are included in the N position coordinate points P and when r or more first extrapolation coordinate points P21 that are obtained in succession are included, the reliability is 70%. When m or more first extrapolation coordinate points P21 are included in the N position coordinate points P and when only less than r first extrapolation coordinate points P21 that are obtained in succession are included, the reliability is 80%. When only less than m first extrapolation coordinate points P21 are included in the N position coordinate points P and when r or more first extrapolation coordinate points P21 that are obtained in succession are included, the reliability is 90%. When only less than m first extrapolation coordinate points P21 are included in the N position coordinate points P and when only less than r first extrapolation coordinate points P21 that are obtained in succession are included, the reliability is 100%.

Next, another exemplary reliability determination of the traveling direction vector 4 is described with reference to the flow chart shown in FIG. 5.

Figure 5:
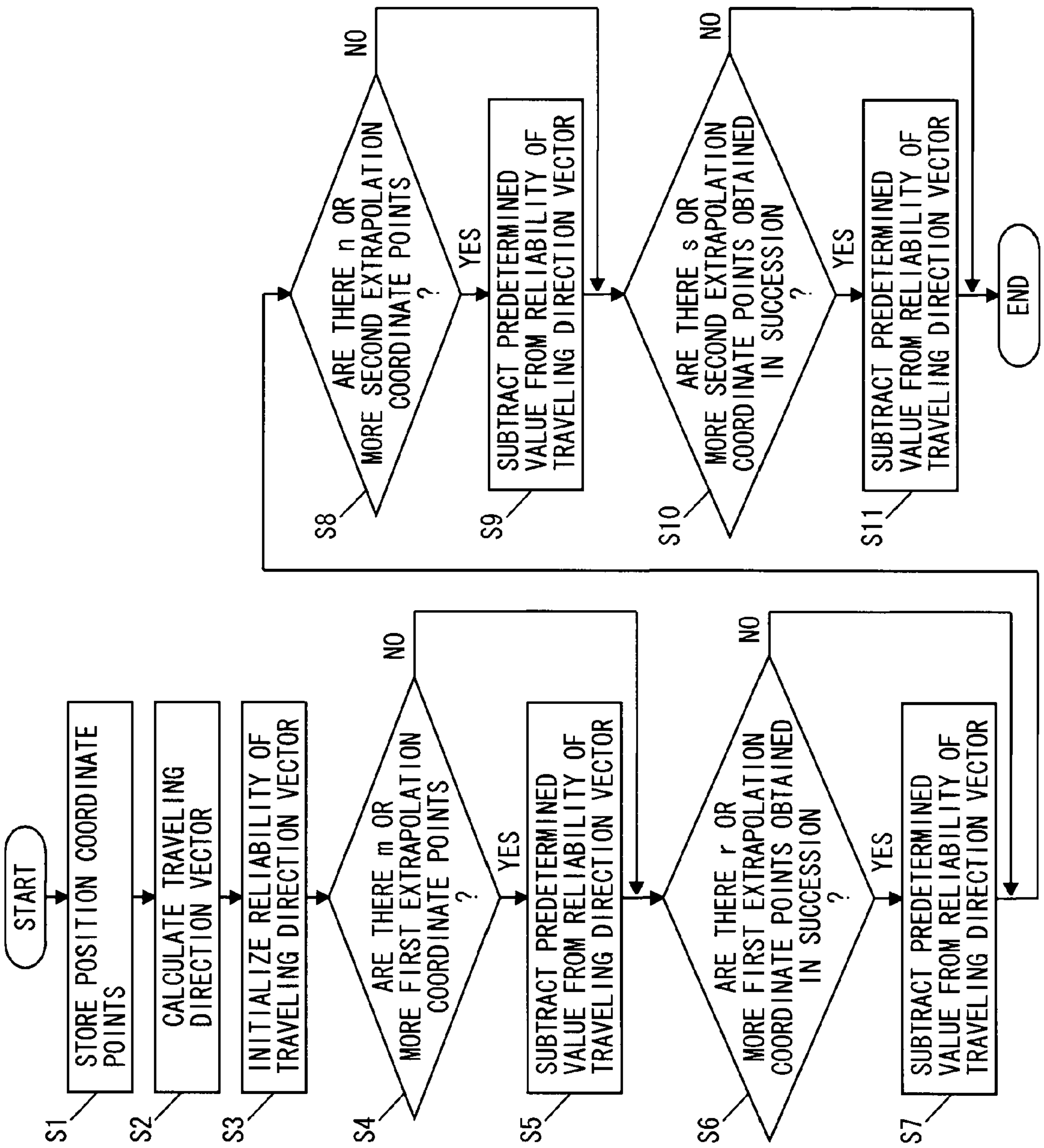
FIG. 5 shows another example of traveling direction vector reliability determination in the first embodiment.

Step S1 to Step S7 of the reliability determination shown in FIG. 5 are the same as those in the example shown in FIG. 4, but the reliability determination shown in FIG. 5 is different from the example shown in FIG. 4 in that the former has Step S8 to Step S11 in addition. Hereinafter, description is omitted about Step S1 to Step S7, and description is given only with regard to Step S8 to Step S11.

As shown in FIG. 5, in Step S8, the reliability calculation section 6 determines whether or not n (n is an arbitrary integer not less than 1 and not more than N) or more second extrapolation coordinate points P22 are included in the N position coordinate points P.

When n or more second extrapolation coordinate points P22 are included (YES in Step S8), a predetermined value is subtracted from the reliability of the traveling direction vector 4 (Step S9). Although the predetermined value to be subtracted in Step S8 is not limited in particular, 20%, for example, is subtracted.

On the other hand, when only less than n second extrapolation coordinate points P22 are included (NO in Step S8), the processing proceeds to Step S10.

In Step S10, the reliability calculation section 6 determines whether or not s (s is an arbitrary integer not less than 1 and not more than N) or more second extrapolation coordinate points P21 that are obtained in succession are included in the N position coordinate points P.

When s or more second extrapolation coordinate points P22 that are obtained in succession are included (YES in Step S10), a predetermined value is subtracted from the reliability of the traveling direction vector 4 (Step S11), and the processing is ended. Although the predetermined value to be subtracted in Step S10 is not limited in particular, 10%, for example, is subtracted.

On the other hand, when only less than s second extrapolation coordinate points P22 that are obtained in succession are included (NO in Step S10), the processing is ended.

This is the end of another exemplary reliability determination of traveling direction vector 4.

As described above, when the value to be subtracted in Step S4 is set to 20%, the value to be subtracted in Step S6 is set to 10%, the value to be subtracted in Step S8 is set to 20%, and the value to be subtracted in Step S10 is set to 10%, the reliability is determined in the following manner. That is, when m or more first extrapolation coordinate points P21 are included in the N position coordinate points P and r or more first extrapolation coordinate points P21 that are obtained in succession are included in N position coordinate points P, and when n or more second extrapolation coordinate points P22 are included in the N position coordinate points P and s or more second extrapolation coordinate points P22 that are obtained in succession are included, the reliability is 40%. Further, when m or more first extrapolation coordinate points P21 are included in the N position coordinate points P and r or more first extrapolation coordinate points P21 that are obtained in succession are included in N position coordinate points P, and when only less than n second extrapolation coordinate points P22 are included in the N position coordinate points P and only less than s second extrapolation coordinate points P22 that are obtained in succession are included, the reliability is 70%.

As described above, according to the first embodiment, the reliability of the traveling direction vector 4 of said another vehicle 3 can be calculated. In the processing to be performed, if the reliability is higher than a predetermined threshold, the device that takes safety measures is caused to operate based on the result of the collision prediction about a collision between said another vehicle 3 and the own vehicle 9, and if the reliability is lower than the predetermined threshold, the device that takes safety measures is inhibited from operating by canceling the result of the collision prediction about a collision between said another vehicle 3 and the own vehicle 9. This increases the reliability of the collision prediction, thereby enabling reduction of unnecessary operations of the device that takes safety measures.

Figure 6:
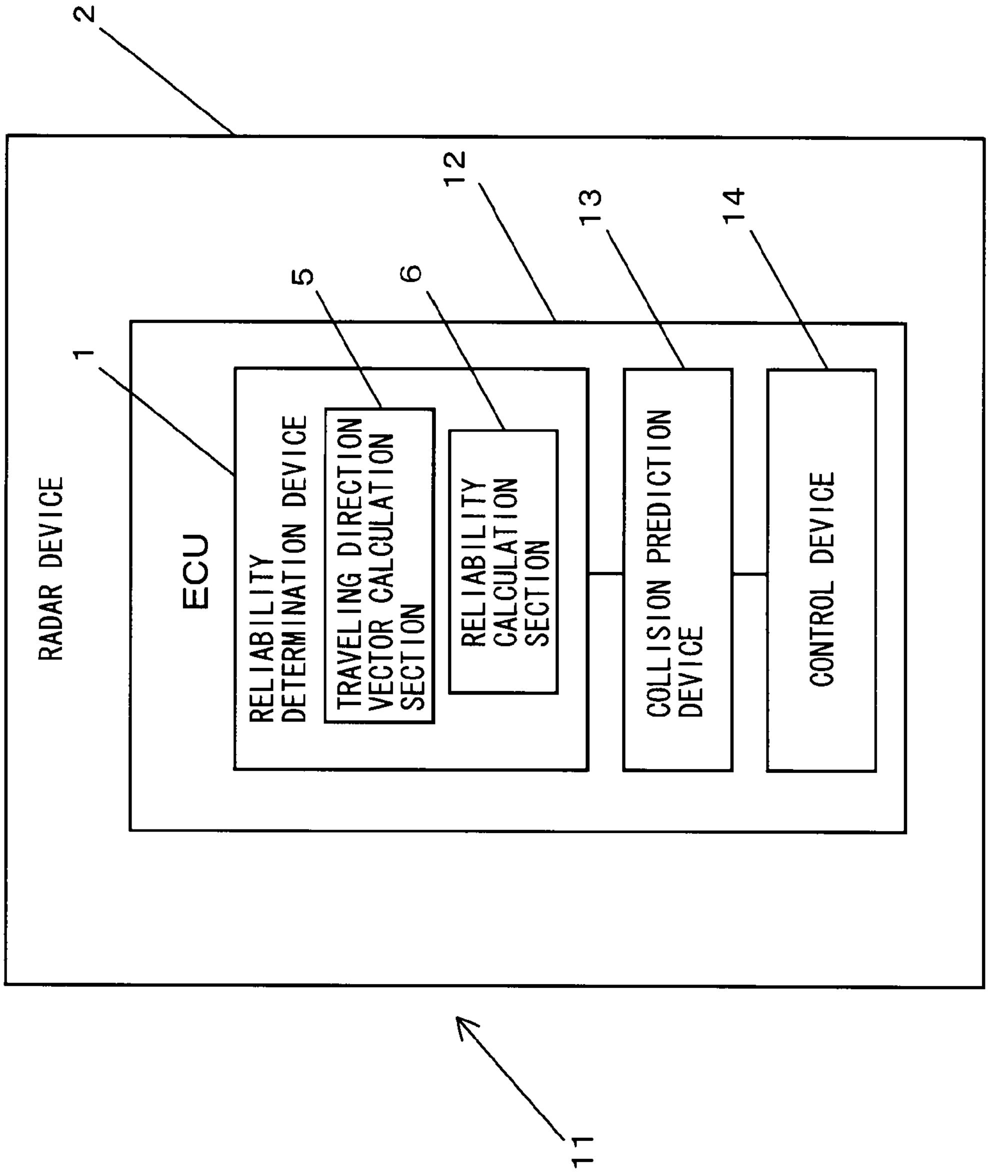
FIG. 6 is a block diagram illustrating another example of the traveling direction vector reliability determination device for realizing the first embodiment of the traveling direction vector reliability determination method.
Figure 7:
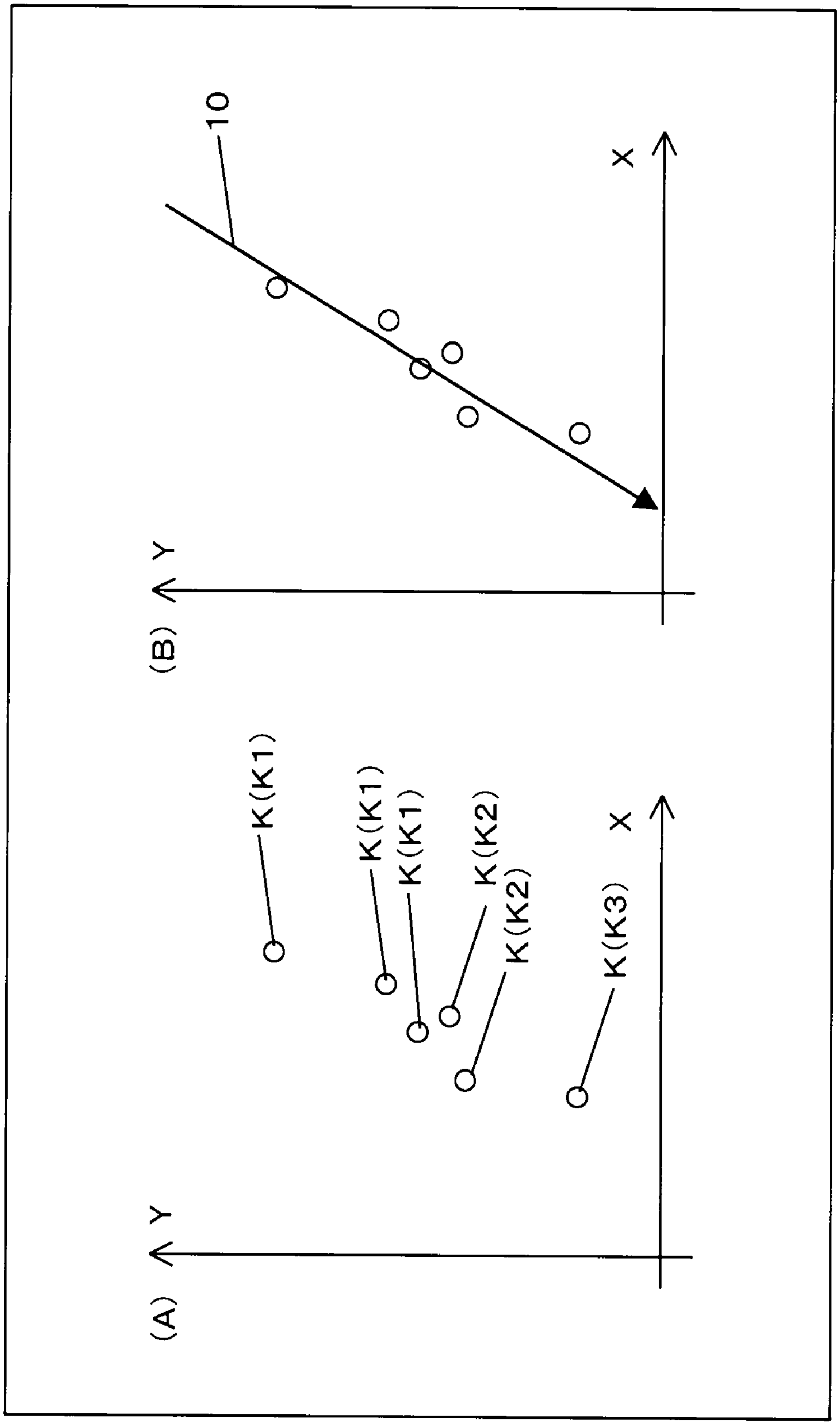
FIG. 7 shows an example of a method for calculating a traveling direction vector.

Note that, although in the example shown in FIG. 1, the radar device 2 and the ECU 12 have been arranged separately, the ECU 12 may be arranged within the radar device 2 as shown in FIG. 6.

In addition, in the example shown in FIG. 3, the traveling direction vector calculation section 5 calculates the traveling direction vector 4, based on the movement history of the normally recognized coordinate points P1, the first extrapolation coordinate points P21, and the second extrapolation coordinate points P22. However, the traveling direction vector calculation section 5 may calculate the traveling direction vector, based on the movement history of the normally recognized coordinate points P1, using neither the first extrapolation coordinate points P21 nor the second extrapolation coordinate points P22. Alternatively, the traveling direction vector calculation section 5 may calculate the traveling direction vector, based on the movement history of the normally recognized coordinate points P1 and either one of the first extrapolation coordinate points P21 and the second extrapolation coordinate points P22. In any of the cases described above, the reliability determination can be performed by using the same processes as, for example, steps S3 to S7 shown in FIG. 4 and the steps S3 to S11 shown in FIG. 5.

INDUSTRIAL APPLICABILITY

The present invention can be applicable to vehicles and the like which have a pre-crash safety system.

The invention claimed is:

1. A traveling direction vector reliability determination method for determining reliability of a traveling direction vector using a computing device including a processor when the traveling direction vector is calculated based on position coordinate points of a target, the position coordinate points being calculated by a radar device, the method comprising:

a traveling direction vector calculation step of calculating, based on a movement history of the position coordinate points, the traveling direction vector of the target; and a reliability calculation step of calculating, in a case where the position coordinate points include at least one normally recognized coordinate point normally recognized by the radar device and at least one estimated coordinate point estimated by the radar device, the reliability of the traveling direction vector, based on at least one of information about the at least one normally recognized coordinate point and information about the at least one estimated coordinate point.

2. The traveling direction vector reliability determination method according to claim 1, wherein, in the reliability calculation step, the reliability of the traveling direction vector is calculated based on a percentage of points which are the at least one normally recognized coordinate point in the position coordinate points.

3. The traveling direction vector reliability determination method according to claim 1, wherein, in the reliability calculation step, the reliability of the traveling direction vector is calculated based on a percentage of points which are the at least one estimated coordinate point in the position coordinate points.

4. The traveling direction vector reliability determination method according to claim 1, wherein, in the reliability calculation step, the reliability of the traveling direction vector is calculated based on the number of the at least one estimated coordinate point obtained in succession.

5. The traveling direction vector reliability determination method according to claim 1, wherein:

the at least one estimated coordinate point includes at least one first extrapolation coordinate point estimated through first extrapolation processing; and in the first extrapolation processing, in a case where the radar device has succeeded in detecting one of the position coordinate points and a relative velocity of the target in a previous detection cycle but has failed in detecting any of measurement parameters for specifying a position coordinate point and a relative velocity of the target in a current detection cycle, the radar device estimates the position coordinate point and the relative velocity of the current detection cycle, based on values of the measurement parameters for the target which are obtained in the previous detection cycle.

6. The traveling direction vector reliability determination method according to claim 5, wherein, in the reliability calculation step, the reliability of the traveling direction vector is calculated based on a percentage of points which are the at least one first extrapolation coordinate point in the position coordinate points.

7. The traveling direction vector reliability determination method according to claim 5, wherein, in the reliability calculation step, the reliability of the traveling direction vector is calculated based on the number of the at least one first extrapolation coordinate point obtained in succession.

8. The traveling direction vector reliability determination method according to claim 5, wherein, in a case where the radar device is an FM-CW radar, the measurement parameters for specifying the position coordinate point and the relative velocity of the target are a beat frequency of an up section of, and a beat frequency of a down section of, a modulation wave.

9. The traveling direction vector reliability determination method according to claim 1, wherein:

the at least one estimated coordinate point includes at least one extrapolation coordinate point estimated through extrapolation processing; and in the extrapolation processing, in a case where the radar device has succeeded in detecting one of the position coordinate points and a relative velocity of the target in a previous detection cycle but has failed in detecting some of measurement parameters for specifying a position coordinate point and a relative velocity of the target in a current detection cycle, the radar device estimates the position coordinate point and the relative velocity of the current detection cycle, based on values of the measurement parameters for the target which are obtained in the previous detection cycle.

10. The traveling direction vector reliability determination method according to claim 9, wherein, in the reliability calculation step, the reliability of the traveling direction vector is calculated based on a percentage of points which are the at least one extrapolation coordinate point in the position coordinate points.

11. The traveling direction vector reliability determination method according to claim 9, wherein, in the reliability calculation step, the reliability of the traveling direction vector is calculated based on the number of the at least one second extrapolation coordinate point obtained in succession.

12. The traveling direction vector reliability determination method according to claim 1, wherein:

the at least one estimated coordinate point includes at least one of at least one first extrapolation coordinate point estimated through first extrapolation processing and at least one second extrapolation coordinate point estimated through second extrapolation processing;

in the first extrapolation processing, in a case where the radar device has succeeded in detecting one of the position coordinate points and a relative velocity of the target in a previous detection cycle but has failed in detecting any of measurement parameters for specifying a position coordinate point and a relative velocity of the target in a current detection cycle, the radar device estimates the position coordinate point and the relative velocity of the current detection cycle, based on values of the measurement parameters for the target which are obtained in the previous detection cycle; and in the second extrapolation processing, in a case where the radar device has succeeded in detecting one of the position coordinate points and a relative velocity of the target in a previous detection cycle but has failed in detecting some of the measurement parameters for specifying a position coordinate point and a relative velocity of the target in a current detection cycle, the radar device estimates the position coordinate point and the relative velocity of the current detection cycle, based on values of the measurement parameters for the target which are obtained in the previous detection cycle.

13. The traveling direction vector reliability determination method according to claim 1, wherein, in the traveling direction vector calculation step, the traveling direction vector of the target is calculated based on the movement history of the at least one normally recognized coordinate point.

14. The method according to claim 1, wherein the information about the at least one normally recognized coordinate point includes information about a relative prevalence of the at least one normally recognized coordinate point, and the information about the at least one estimated coordinate point includes information about a relative prevalence of the at least one estimated coordinate point.

15. A traveling direction vector reliability determination device including a processor and for determining reliability of a traveling direction vector when the traveling direction vector is calculated based on position coordinate points of a target, the position coordinate points being calculated by a radar device, the device comprising:

a traveling direction vector calculation section that calculates, based on a movement history of the position coordinate points, the traveling direction vector of the target; and a reliability calculation section that calculates, in a case where the position coordinate points include at least one normally recognized coordinate point normally recognized by the radar device and at least one estimated coordinate point estimated by the radar device, the reliability of the traveling direction vector, based on at least one of information about the at least one normally recognized coordinate point and information about the at least one estimated coordinate point.

* * * * *